(12) United States Patent
Chen

(10) Patent No.: US 10,430,690 B1
(45) Date of Patent: Oct. 1, 2019

(54) MACHINE LEARNING PREDICTIVE LABELING SYSTEM

(71) Applicant: SAS Institute Inc., Cary, NC (US)

(72) Inventor: Xu Chen, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/400,157

(22) Filed: May 1, 2019

Related U.S. Application Data

(63) Continuation-in-part of application No. 16/162,794, filed on Oct. 17, 2018, which is a continuation-in-part of application No. 16/108,293, filed on Aug. 22, 2018, now Pat. No. 10,275,690.

(60) Provisional application No. 62/805,280, filed on Feb. 13, 2019, provisional application No. 62/739,323, filed on Sep. 30, 2018, provisional application No. 62/660,886, filed on Apr. 20, 2018.

(51) Int. Cl.
| | |
|---|---|
| *G06N 5/00* | (2006.01) |
| *G06K 9/62* | (2006.01) |
| *G06F 17/18* | (2006.01) |
| *G06N 20/10* | (2019.01) |

(52) U.S. Cl.
CPC ........... *G06K 9/6256* (2013.01); *G06F 17/18* (2013.01); *G06K 9/6214* (2013.01); *G06K 9/6277* (2013.01); *G06K 9/6289* (2013.01); *G06N 5/003* (2013.01); *G06N 20/10* (2019.01)

(58) Field of Classification Search
CPC ..................................................... G06N 5/003
USPC ......................................................... 706/46
See application file for complete search history.

(56) References Cited

U.S. PATENT DOCUMENTS

| | | |
|---|---|---|
| 9,792,562 B1 | 10/2017 | Chen et al. |
| 10,127,477 B2 | 11/2018 | Chen et al. |

OTHER PUBLICATIONS

Zhou et al ("Learning with Local and Global Consistency" 2004) (Year: 2004).*
Zhang et al ("Prototype Vector Machine for Large Scale Semi-Supervised Learning" 2009) (Year: 2009).*
Zhu et al ("Combining Active Learning and Semi-Supervised Learning Using Gaussian Fields and Harmonic Functions" 2003) (Year: 2003).*

(Continued)

*Primary Examiner* — Lut Wong
(74) *Attorney, Agent, or Firm* — Bell & Manning, LLC

(57) ABSTRACT

A computing device predicts an event or classifies an observation. A trained labeling model is executed with unlabeled observations to define a label distribution probability matrix. A label is selected for each observation. A mean observation vector and a covariance matrix are computed from the unlabeled observations selected to have each respective label. A number of eigenvalues that have a smallest value is selected from each covariance matrix and used to define a null space for each respective label. A distance value is computed for a distance vector computed to the mean observation vector and projected into the null space associated with the label selected for each respective observation. A diversity rank is determined for each respective observation based on minimum computed distance values. A predefined number of observations having highest values for the diversity rank are included in labeled observations and removed from the unlabeled observations.

30 Claims, 7 Drawing Sheets

(56) References Cited

OTHER PUBLICATIONS

Konyushkova, Ksenia & Sznitman, Raphael & Fua, Pascal. NIPS (2017). Learning Active Learning from Real and Synthetic Data, 11 pages.
Dong-Hyan Lee, Pseudo-Label: The Simple and Efficient Semi-supervised Learning Method for Deep Neural Networks, ICML 2003 Workshop, 6 pages.
N. Vaswani and R. Chellappa, Principal Component Null Space Analysis for Image and Video Classification. IEEE Transactions on Image Processing, vol. 15, No. 7, Jul. 2006, pp. 1816-1830.

* cited by examiner

MACHINE LEARNING PREDICTIVE LABELING SYSTEM

CROSS-REFERENCE TO RELATED APPLICATIONS

The present application claims the benefit of and priority under 35 U.S.C. § 119(e) to U.S. Provisional Patent Application No. 62/805,280 filed on Feb. 13, 2019, the entire contents of which is hereby incorporated by reference. The present application also claims the benefit of and priority under 35 U.S.C. § 119(e) to U.S. Provisional Patent Application No. 62/739,323 filed on Sep. 30, 2018, the entire contents of which is hereby incorporated by reference.

The present application is also a continuation-in-part of U.S. patent application Ser. No. 16/162,794 that was filed Oct. 17, 2018, and published as U.S. Patent Publication No. 2019/0050368 on Mar. 14, 2019, the entire contents of which is hereby incorporated by reference. U.S. patent application Ser. No. 16/162,794 claimed the benefit of and priority under 35 U.S.C. § 119(e) to U.S. Provisional Patent Application No. 62/739,323 filed on Sep. 30, 2018, the entire contents of which is hereby incorporated by reference. U.S. patent application Ser. No. 16/162,794 claimed the benefit of and priority under 35 U.S.C. § 119(e) to U.S. Provisional Patent Application No. 62/660,886 filed on Apr. 20, 2018, the entire contents of which is hereby incorporated by reference.

U.S. patent application Ser. No. 16/162,794 is also a continuation-in-part of U.S. patent application Ser. No. 16/108,293 that was filed Aug. 22, 2018, and issued Apr. 30, 2019 as U.S. Pat. No. 10,275,690, the entire contents of which is hereby incorporated by reference. U.S. patent application Ser. No. 16/108,293 claimed the benefit of and priority under 35 U.S.C. § 119(e) to U.S. Provisional Patent Application No. 62/660,886 filed on Apr. 20, 2018, the entire contents of which is hereby incorporated by reference.

BACKGROUND

Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled in training data to indicate occurrence or non-occurrence of the event or to recognize/classify the object. An unsupervised learning system predicts the label, target variable y, in training data by defining a model that describes the hidden structure in the training data. Supervised learning requires that the target (dependent) variable y be labeled in training data so that a model can be built to predict the label of new unlabeled data. A supervised learning system discards observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the prediction/classification (data labeling) model.

SUMMARY

In an example embodiment, a non-transitory computer-readable medium is provided having stored thereon computer-readable instructions that, when executed by a computing device, cause the computing device to predict occurrence of an event or to classify an object using semi-supervised data to label unlabeled data in a dataset. A plurality of labeled observation vectors is read from a dataset. A plurality of unlabeled observation vectors is read from the dataset. (A) A labeling model is trained using the read plurality of labeled observation vectors. (B) The trained labeling model is executed with each observation vector of the plurality of unlabeled observation vectors to define a label distribution probability matrix that defines a label probability for each label of a label set for each observation vector of the plurality of unlabeled observation vectors. (C) A label is selected for each observation vector of the plurality of unlabeled observation vectors as the label associated with a maximum label probability value in the label distribution probability matrix for a respective observation vector of the plurality of unlabeled observation vectors. (D) For each label of the label set, a mean observation vector is computed from the observation vectors of the plurality of unlabeled observation vectors selected to have each respective label. (E) For each label of the label set, a covariance matrix is computed from the observation vectors of the plurality of unlabeled observation vectors selected to have each respective label. (F) For each label of the label set, a number of eigenvalues is selected from the covariance matrix computed for each respective label. The selected eigenvalues have a smallest value of the eigenvalues for each respective label. (G) For each label of the label set, a null space is defined using the selected eigenvalues for each respective label. (H) For each observation vector of the plurality of unlabeled observation vectors, a distance vector is computed from each respective observation vector to the computed mean observation vector associated with the label selected for each respective observation vector. (I) For each observation vector of the plurality of unlabeled observation vectors, a distance value is computed from each respective computed distance vector projected into the defined null space associated with the label selected for each respective observation vector. (J) For each observation vector of the plurality of unlabeled observation vectors, a diversity rank is determined based on a minimum computed distance value for the computed distance value for each respective observation vector. (K) A predefined number of observation vectors is selected from the plurality of unlabeled observation vectors. The predefined number of observation vectors have the predefined number of observation vectors number of highest values for the diversity rank. (L) The plurality of labeled observation vectors is updated to include the selected observation vectors with the label selected for each respective observation vector. (M) The selected observation vectors are removed from the plurality of unlabeled observation vectors. (N) Operations (A) to (M) are repeated a predefined number of times. After the predefined number of times, the label selected for each observation vector of the plurality of unlabeled observation vectors is output to a second dataset.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to predict occurrence of an event or classify an object using semi-supervised data to label unlabeled data in a dataset.

In an example embodiment, a method of predicting occurrence of an event or classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
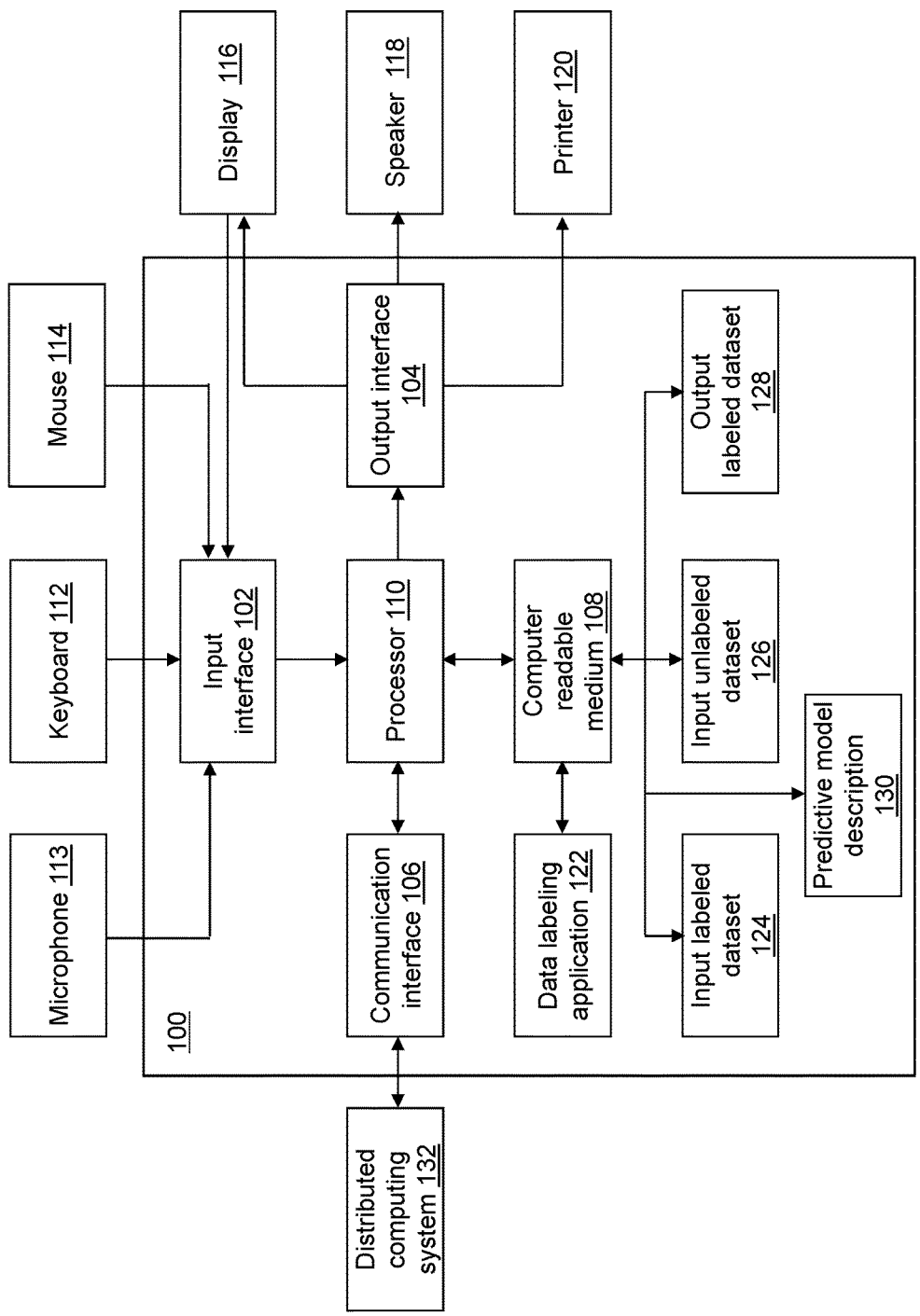
FIG. 1 depicts a block diagram of a data labeling device in accordance with an illustrative embodiment.

Referring to FIG. 1, a block diagram of a data labeling device 100 is shown in accordance with an illustrative embodiment. Data labeling device 100 may include an input interface 102, an output interface 104, a communication interface 106, a non-transitory computer-readable medium 108, a processor 110, a data labeling application 122, an input labeled dataset 124, an input unlabeled dataset 128, an output labeled dataset 128, and a predictive model description 130. Fewer, different, and/or additional components may be incorporated into data labeling device 100.

Data labeling application 122 uses an approximate null space distance as a space to measure a diversity of correlated high dimensional data. Data labeling application 122 further fuses uncertainty and diversity information by integrating an uncertainty rank value with a diversity rank value. Data labeling application 122 may use an alternating label selection process to determine the diversity rank value. Experimental evaluations demonstrate the significant advantages of data labeling application 122.

Input interface 102 provides an interface for receiving information from the user or another device for entry into data labeling device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into data labeling device 100 or to make selections presented in a user interface displayed on display 116. The same interface may support both input interface 102 and output interface 104. For example, display 116 comprising a touch screen provides a mechanism for user input and for presentation of output to the user. Data labeling device 100 may have one or more input interfaces that use the same or a different input interface technology. The input interface technology further may be accessible by data labeling device 100 through communication interface 106.

Output interface 104 provides an interface for outputting information for review by a user of data labeling device 100 and/or for use by another application or device. For example, output interface 104 may interface with various output technologies including, but not limited to, display 116, a speaker 118, a printer 120, etc. Data labeling device 100 may have one or more output interfaces that use the same or a different output interface technology. The output interface technology further may be accessible by data labeling device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data labeling device 100 may have one or more communication interfaces that use the same or a different communication interface technology. For example, data labeling device 100 may support communication using an Ethernet port, a Bluetooth antenna, a telephone jack, a USB port, etc. Data and messages may be transferred between data labeling device 100 and distributed computing system 132 using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data labeling device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data labeling device 100 also may have one or more drives that support the loading of a memory media such as a CD, DVD, an external hard drive, etc. One or more external hard drives further may be connected to data labeling device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data labeling device 100 may include a plurality of processors that use the same or a different processing technology.

Data labeling application 122 performs operations associated with defining output labeled dataset 128 and/or predictive model description 130 from data stored in input labeled dataset 124 and input unlabeled dataset 126. Some or all of the operations described herein may be embodied in data labeling application 122.

Referring to the example embodiment of FIG. 1, data labeling application 122 is implemented in software (comprised of computer-readable and/or computer-executable instructions) stored in computer-readable medium 108 and accessible by processor 110 for execution of the instructions that embody the operations of data labeling application 122. Data labeling application 122 may be written using one or more programming languages, assembly languages, scripting languages, etc. Data labeling application 122 may be integrated with other analytic tools. For example, data labeling application 122 may be part of SAS® Enterprise Miner™ developed and provided by SAS Institute Inc. of Cary, N.C. that may be used to create highly accurate predictive and descriptive models based on analysis of vast amounts of data from across an enterprise. Data labeling application 122 further may be part of SAS® Enterprise Guide, SAS® Visual Analytics, SAS® LASR™ Analytic Server, and/or SAS® Access Engine(s) also developed and provided by SAS Institute Inc. of Cary, N.C., USA.

Data labeling application 122 is applicable in a variety of industries. For example, data labeling application 122 may be used to recognize text, recognize text meaning, recognize a voice, recognize speech, recognize characteristics of images such as medical images, equipment diagnostic images, terrain images, etc., recognize types of web pages, predict whether or not an event has occurred, such as an equipment failure, etc. Data labeling application 122 may be integrated with other data processing tools to automatically process data generated as part of operation of an enterprise, facility, system, device, etc., to label the data, and to provide a warning or alert associated with the labeling using input interface 102, output interface 104, and/or communication interface 106 so that appropriate action can be initiated in response to the labeling. For example, medical images that include a tumor may be recognized by data labeling application 122 which triggers a notification message sent to a clinician that a tumor has been identified based on a "tumor" label determined for the image data.

Data labeling application 122 may be implemented as a Web application. For example, data labeling application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input labeled dataset 124 and input unlabeled dataset 126 may include, for example, a plurality of rows and a plurality of columns. The plurality of rows may be referred to as observation vectors or records, and the columns may be referred to as variables. Input labeled dataset 124 and input unlabeled dataset 126 may be transposed. An observation vector $x_i$ may include a value for each of the plurality of variables associated with the observation vector having index i. Each variable of the plurality of variables may describe a characteristic of a physical object, such as a living thing, a vehicle, terrain, a computing device, a physical environment, etc. For example, if input labeled dataset 124 and input unlabeled dataset 126 include data related to operation of a vehicle, the variables may include an oil pressure, a speed, a gear indicator, a gas tank level, a tire pressure for each tire, an engine temperature, a radiator level, etc. Input labeled dataset 124 and input unlabeled dataset 126 may include data captured as a function of time for one or more physical objects.

Input labeled dataset 124 includes observation vectors that have been labeled, for example, by a human or other machine learning labeling process. For example, the label may indicate a class for the observation vector or otherwise indicate an identification of a characteristic of the observation vector. Input labeled dataset 124 includes a $y_i$-variable (target) value that indicates the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. Input unlabeled dataset 126 includes observation vectors $x_i$ that have not been labeled such that the $y_i$-variable (target) value has not been determined. Input labeled dataset 124 and input unlabeled dataset 126 may be stored in a single database, file, etc. where the $y_i$-variable (target) value indicates whether the associated observation vector has been labeled.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input labeled dataset 124 and input unlabeled dataset 126 may include image data captured by medical imaging equipment (i.e., computed tomography image, magnetic resonance image, x-ray image, ultrasound image, etc.) of a body part of a living thing. A subset of the image data is labeled and captured in input labeled dataset 124, for example, as either indicating existence of a medical condition or non-existence of the medical condition. Input labeled dataset 124 and input unlabeled dataset 126 may include a reference to image data that may be stored, for example, in an image file or in a video file, and the existence/non-existence label associated with each image file or video file. Input labeled dataset 124 and input unlabeled dataset 126 include a plurality of such references. The existence/non-existence label or other label may be defined by a clinician or expert in the field to which data stored in input labeled dataset 124 and input unlabeled dataset 126 relates.

The data stored in input labeled dataset 124 and input unlabeled dataset 126 may be generated by and/or captured from a variety of sources including one or more sensors of the same or different type, one or more computing devices, etc. The data stored in input labeled dataset 124 and input unlabeled dataset 126 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Input labeled dataset 124 and input unlabeled dataset 126 may be stored on computer-readable medium 108 or on one or more computer-readable media of distributed computing system 132 and accessed by data labeling device 100 using communication interface 106, input interface 102, and/or output interface 104. Data stored in input labeled dataset 124 and input unlabeled dataset 126 may be sensor measurements or signal values captured by a sensor, may be generated or captured in response to occurrence of an event or a transaction, generated by a device such as in response to an interaction by a user with the device, etc. The data stored in input labeled dataset 124 and input unlabeled dataset 126 may be captured at different date/time points periodically, intermittently, when an event occurs, etc. Each record of input labeled dataset 124 and input unlabeled dataset 126 may include one or more date values and/or time values.

Input labeled dataset 124 and input unlabeled dataset 126 may include data captured at a high data rate such as 200 or more observations per second for one or more physical objects. For example, data stored in input labeled dataset 124 and input unlabeled dataset 126 may be generated as part of the Internet of Things (IoT), where things (e.g., machines, devices, phones, sensors) can be connected to networks and the data from these things collected and processed within the things and/or external to the things before being stored in input labeled dataset 124 and input unlabeled dataset 126. For example, the IoT can include sensors in many different devices and types of devices. Some of these devices may be referred to as edge devices and may involve edge computing circuitry. These devices may provide a variety of stored or generated data, such as network data or data specific to the network devices themselves. Some data may be processed with an event stream processing engine, which may reside in the cloud or in an edge device before being stored in input labeled dataset 124 and input unlabeled dataset 126.

Input labeled dataset 124 and input unlabeled dataset 126 may be stored using one or more of various structures as known to those skilled in the art including one or more files of a file system, a relational database, one or more tables of a system of tables, a structured query language database, etc. on data labeling device 100 or on distributed computing system 132. Data labeling device 100 may coordinate access to input labeled dataset 124 and input unlabeled dataset 126 that is distributed across distributed computing system 132 that may include one or more computing devices that can communicate using a network. For example, input labeled dataset 124 and input unlabeled dataset 126 may be stored in a cube distributed across a grid of computers as understood by a person of skill in the art. As another example, input labeled dataset 124 and input unlabeled dataset 126 may be stored in a multi-node Hadoop® cluster. For instance, Apache™ Hadoop® is an open-source software framework for distributed computing supported by the Apache Software Foundation. As another example, input labeled dataset 124 and input unlabeled dataset 126 may be stored in a cloud of computers and accessed using cloud computing technologies, as understood by a person of skill in the art. The SAS® LASR™ Analytic Server may be used as an analytic platform to enable multiple users to concurrently access data stored in input labeled dataset 124 and input unlabeled dataset 126. The SAS® Viya™ open, cloud-ready, in-memory architecture also may be used as an analytic platform to enable multiple users to concurrently access data stored in input labeled dataset 124 and input unlabeled dataset 126. Some systems may use SAS In-Memory Statistics for Hadoop® to read big data once and analyze it several times by persisting it in-memory for the entire session. Some systems may be of other types and configurations.

Output labeled dataset 128 may be identical to input labeled dataset 124 and input unlabeled dataset 126 except that output labeled dataset 128 includes only labeled data such that the $y_i$-variable (target) value of each observation vector $x_i$ is labeled. For example, in the medical imaging example, the existence or non-existence label is associated with each observation vector that may be an image.

Figure 2A:
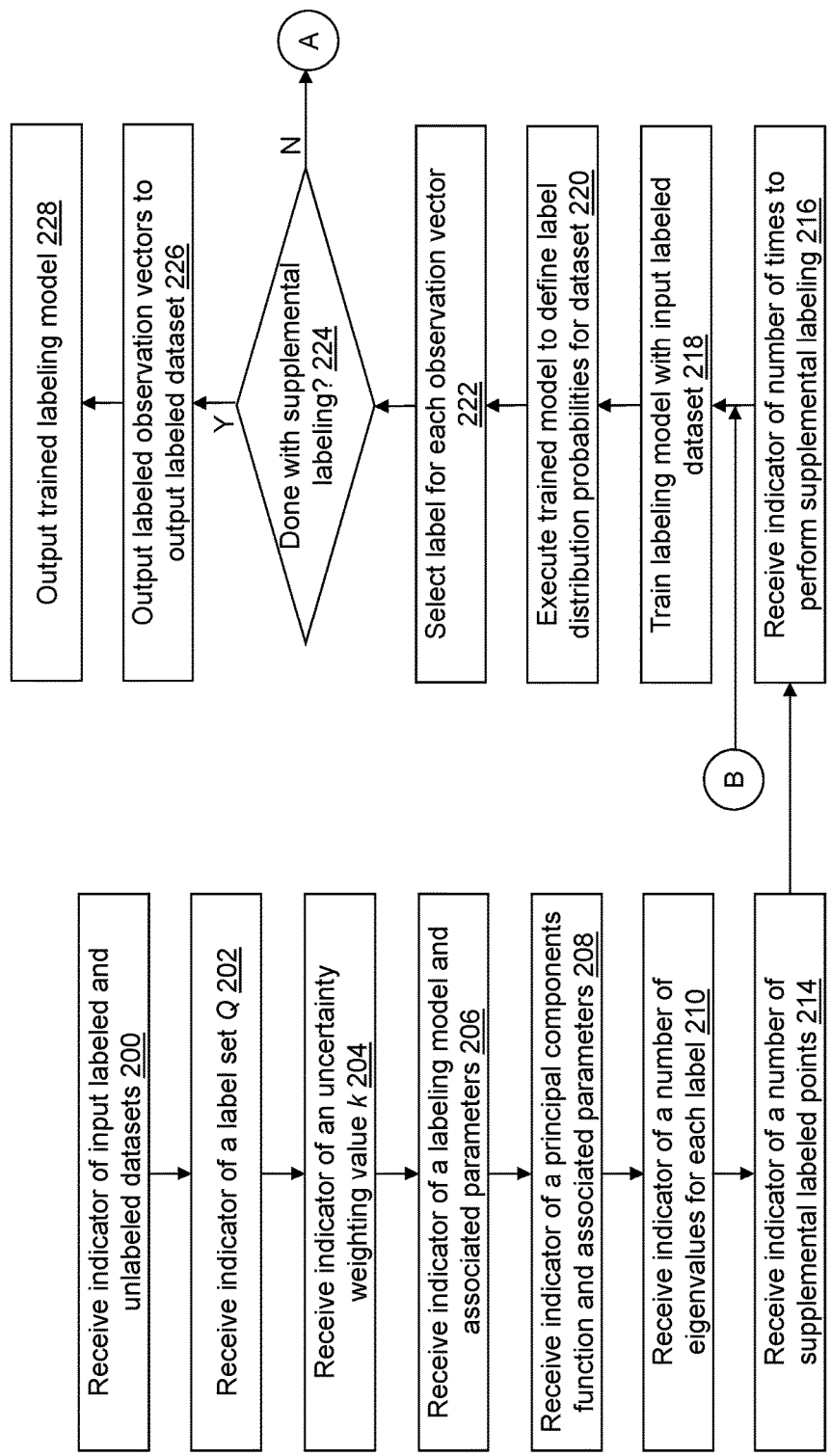
FIGS. 2A and 2B depict a flow diagram illustrating examples of operations performed by the data labeling device of FIG. 1 in accordance with an illustrative embodiment.
Figure 2B:
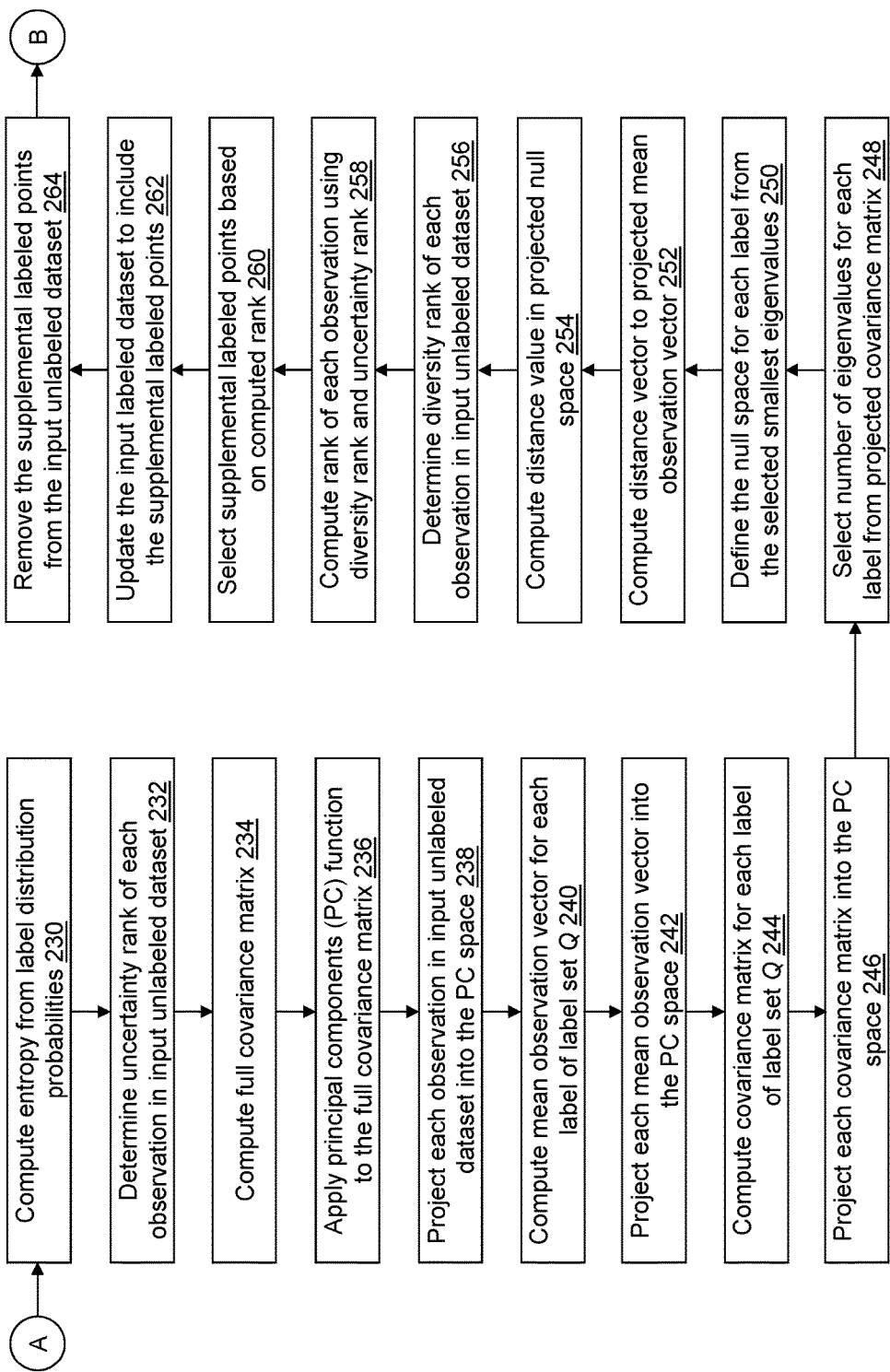

Referring to FIGS. 2A and 2B, example operations associated with data labeling application 122 are described. For example, data labeling application 122 may be used to create output labeled dataset 128 and predictive model description 130 from input labeled dataset 124 and input unlabeled dataset 126. On each iteration, additional observations of input unlabeled dataset 126 are labeled and added to input labeled dataset 124. Data labeling application 122 has been shown to improve the accuracy of labels defined in output labeled dataset 128 at much lower cost due to a reduced reliance on human labor while achieving improved accuracy in comparison with existing processes.

Additional, fewer, or different operations may be performed depending on the embodiment of data labeling application 122. The order of presentation of the operations of FIGS. 2A and 2B is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute data labeling application 122, which causes presentation of a first user interface window, which may include a plurality of menus and selectors such as drop down menus, buttons, text boxes, hyperlinks, etc. associated with data labeling application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by data labeling application 122.

Referring to FIG. 2A, in an operation 200, a first indicator may be received that indicates input labeled dataset 124 and input unlabeled dataset 126. For example, the first indicator indicates a location and a name of input labeled dataset 124 and of input unlabeled dataset 126 that may be stored in a single dataset. As an example, the first indicator may be received by data labeling application 122 after selection from a user interface window or after entry by a user into a user interface window. In an alternative embodiment, input labeled dataset 124 and input unlabeled dataset 126 may not be selectable. For example, a most recently created dataset may be used automatically.

In an operation 202, a second indicator may be received that indicates a label set Q associated with input labeled dataset 124. For example, the label set Q includes a list of permissible values that the $y_i$-variable (target) value of each observation vector $x_i$ may have. For illustration, if input labeled dataset 124 and input unlabeled dataset 126 include text images of numeric digits, the label set Q includes c=10 permissible values that may be indicated as Q={0, . . . , 9}, where c=1 may be associated with the digit "0", c=2 may be associated with the digit "1", c=3 may be associated with the digit "2", . . . , c=10 may be associated with the digit "9". No $y_i$-variable (target) value may indicate that the associated observation vector $x_i$ is not labeled when input labeled dataset 124 and input unlabeled dataset 126 are stored in a single dataset. In an alternative embodiment, a $y_i$-variable (target) value, for example, of zero may indicate that the associated observation vector $x_i$ is not labeled when input labeled dataset 124 and input unlabeled dataset 126 are stored in a single dataset where the value of zero is not included in the label set Q. For illustration, a number of observation vectors initially included in input labeled dataset 124 may be a small percentage, such as less than 1% of the observation vectors $x_i$ included in input unlabeled dataset 126. Data labeling application 122 determines a label from label set Q for each observation vector $x_i$ included in input unlabeled dataset 126. The resulting fully labeled (supervised) data is stored in output labeled dataset 128.

In an operation 204, a third indicator may be received that indicates an uncertainty weighting value k, where k is selected between zero and one. The uncertainty weighting value k specifies a portion of an uncertainty rank value to include in a combined rank value computed for each observation vector included in input unlabeled dataset 126.

In an operation 206, a fourth indicator of a labeling model to apply may be received. For example, the fourth indicator indicates a name of a labeling model and any associated parameters used to define execution of the labeling model trained using input labeled dataset 124. The fourth indicator may be received by data labeling application 122 after selection from a user interface window or after entry by a user into a user interface window. A default value for the labeling model may further be stored, for example, in computer-readable medium 108. As an example, a labeling model may be selected from "SVM", "K-Cluster", "Neural Network", "LOG REG", "Forest", "Gradient Boosting", "Decision Tree", etc. The labeling model indicated by "SVM" may refer to a support vector machine (SVM) model type. The labeling model indicated by "K-Cluster" may refer to a k-means clustering model type. The labeling model indicated by "Neural Network" may refer to a neural network model type. The labeling model indicated by "LOG REG" may refer to a logistic regression model type. The labeling model indicated by "Forest" may refer to a random forest model type. The labeling model indicated by "Gradient Boosting" may refer to a gradient boosting tree model type. The labeling model indicated by "Decision Tree" may refer to a decision tree model type. For example, a default labeling model may be indicated by "Neural Network". Of course, the labeling model may be labeled or selected in a variety of different manners by the user as understood by a person of skill in the art. In an alternative embodiment, the labeling model may not be selectable, and a single labeling model is implemented by data labeling application 122. For example, the labeling model indicated as "Neural Network" may be used by default or without allowing a selection. One or more parameters that may include hyperparameters may be defined with the fourth indicator based on the labeling model selected that are used for training, validating, and/or executing the indicated labeling model.

In an operation 208, a fifth indicator of a principal components function may be received that performs a principal component analysis on input labeled dataset 124 and input unlabeled dataset 126. For example, the fifth indicator indicates a name of a principal components function or procedure and any associated parameters used to define execution of the principal components function. The fifth indicator may be received by data labeling application 122 after selection from a user interface window or after entry by a user into a user interface window. A default value for the principal components function may further be stored, for example, in computer-readable medium 108. As an example, a principal components function may be selected from "PRINCOMP", "PCA", "Robust PCA", "Laplacian Eigenmap", "Isomap", "LDA", etc. The principal components function may be labeled or selected in a variety of different manners by the user as understood by a person of skill in the art. For illustration, "PRINCOMP" indicates a first principal components procedure, "PCA" indicates a second principal components procedure, and "Robust PCA" indicates a robust PCA. For illustration, "Laplacian Eigenmap" indicates a Laplacian eigenmap. For illustration, "Isomap" indicates an Isomap. For illustration, "LDA" indicates a linear discriminant analysis. For illustration, a MWPCA procedure performs principal component analysis using SAS Visual Data Mining and Machine Learning, an RPCA procedure performs robust PCA using SAS Viya, a HPPRINCOMP procedure performs PCA using SAS High-Performance Procedures, a PRINCOMP procedure performs PCA using SAS/STAT, etc. In an alternative embodiment, the principal components function may not be selectable, and a single principal components function is implemented by data labeling application 122. For example, the principal components function indicated as "RPCA" may be used by default or without allowing a selection.

In an operation 210, a sixth indicator of a number of eigenvalues $n_e$ to use for each label may be received. For example, a value for the number of eigenvalues $n_e$ may be received that indicates the same or a different value for one or more of the labels of label set Q. The number of eigenvalues $n_e$ is used to define a null space for the observation vectors grouped based on the label determined by the labeling model. In an alternative embodiment, the sixth indicator may not be received. For example, a default value for the number of eigenvalues $n_e$ may be stored, for example, in computer-readable medium 108 and used automatically. In another alternative embodiment, the value of the number of eigenvalues $n_e$ may not be selectable. Instead, a fixed, predefined value may be used for each label of label set Q.

In an operation 214, a seventh indicator of a number of supplemental labeled points $N_{SL}$ may be received. In an alternative embodiment, the seventh indicator may not be received. For example, a default value may be stored, for example, in computer-readable medium 108 and used automatically. In another alternative embodiment, the value of the number of supplemental labeled points $N_{SL}$ may not be selectable. Instead, a fixed, predefined value may be used. The number of supplemental labeled points $N_{SL}$ defines a number of additional data points of input unlabeled dataset 126 that are added to input labeled dataset 124 each iteration as described further below. Merely for illustration, the number of supplemental labeled points $N_{SL}$ may be between 2 and 10 though the user may determine that other values are more suitable for their application.

In an operation 216, an eighth indicator of a number of times $M_{SL}$ to perform supplemental labeling may be received. The number of times $M_{SL}$ defines a number of iterations that supplemental labeling is performed. In an alternative embodiment, the eighth indicator may not be received. For example, a default value may be stored, for example, in computer-readable medium 108 and used automatically when the eighth indicator is not received. In an alternative embodiment, the number of times may not be selectable. Instead, a fixed, predefined value may be used. Merely for illustration, the number of times $M_{SL}$ may be set between 3 and 1000 though the user may determine that other values are more suitable for their application as understood by a person of skill in the art, for example, based on computing resources available, size of input labeled dataset 124 and input unlabeled dataset 126, etc.

In an alternative embodiment, a number of additional observation vectors to supplement input labeled dataset 124 may be received instead of the number of times $M_{SL}$. The number of times $M_{SL}$ can be computed from the number of additional observation vectors to supplement input labeled dataset 124 based on the number of supplemental labeled points $N_{SL}$ added each iteration though the number of additional observation vectors to supplement input labeled dataset 124 may be used in an equivalent manner to the number of times $M_{SL}$ as described herein.

In another alternative embodiment, a percentage of the input unlabeled dataset 124 to supplement input labeled dataset 124 may be received instead of the number of times $M_{SL}$ or the number of additional observation vectors to supplement input labeled dataset 124. The number of additional observation vectors to supplement input labeled dataset 124 can be computed from the percentage of the input unlabeled dataset 124 based on a number of observation vectors initially included in input labeled dataset 124.

In an operation 218, a labeling model is trained using each observation vector read from input labeled dataset 124 based on the labeling model and the parameters indicated in operation 206. For example, the model may be trained and validated using a model training function or procedure that is distinct from data labeling application 122 or is integrated with data labeling application 122. The training function or procedure performs operations associated with defining a trained model for labeling input unlabeled dataset 126. The training function or procedure may be integrated with other analytic tools. As an example, the training function or procedure may be part of an integrated data analytics software application and/or software architecture such as that offered by SAS Institute Inc. of Cary, N.C., USA. Merely for illustration, the training function or procedure may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® Cloud Analytic Services, SAS/OR®, SAS/ETS®, SAS® Viya™, SAS In-Memory Statistics for Hadoop®, etc., all of which are developed and provided by SAS Institute Inc. of Cary, N.C., USA. The training function or procedure may be implemented as a Web application. For example, the training function or procedure may use the HPSVM procedure implemented by SAS® Enterprise Miner™ software, the SVMACHINE procedure implemented by SAS® Visual Data Mining and Machine Learning software, the HPLOGISTIC procedure implemented by SAS/STAT® software, the NNET procedure provided by the SAS® Visual Data Mining and Machine Learning software, etc.

In an operation 220, each observation vector of input unlabeled dataset 126 is input to the trained labeling model that is executed to define label distribution probabilities for each observation vector. The label distribution probabilities define a probability value for each label of label set Q that indicates a likelihood that the observation vector is associated with a respective label of label set Q. For illustration, a label distribution probabilities matrix F may be defined having dimension Nxc, where N is a number of observation vectors included in input unlabeled dataset 126, and c is a number of the permissible values that may be indicated by label set Q.

In an operation 222, the $y_j$-variable value of each observation vector $x_j$ is labeled using the label distribution probabilities matrix where $y_j$ is selected for each observation vector $x_j$ based on $$y_j = \underset{i=1,\ldots c}{\mathrm{argmax}} F_{j,i},$$

where j=1, . . . , N is an index to a respective observation vector.

In an operation 224, a determination is made concerning whether or not supplemental labeling is done. When supplemental labeling is done, processing continues in an operation 226. When supplemental labeling is not done, processing continues in an operation 230 shown referring to FIG. 2B. For example, supplemental labeling is done when operation 220 has been performed greater than $M_{SL}$ number of times.

In operation 226, the $y_j$-variable value of each observation vector $x_j$ selected in operation 224 and/or each observation vector $x_j$ included in input labeled dataset 124 is output. For example, each observation vector $x_j$ with its selected $y_j$-variable value and each observation vector $x_j$ included in input labeled dataset 124 with its $y_j$-variable value is stored in output labeled dataset 128. Output labeled dataset 128 may be stored on data labeling device 100 and/or on one or more computing devices of distributed computing system 132 in a variety of formats as understood by a person of skill in the art. All or a subset of output labeled dataset 128 further may be output to display 116, to printer 120, etc. For example, medical images labeled as including a tumor may be recognized by data labeling application 122 and presented on display 116 or indicators of the medical images may be printed on printer 120. As another option, a notification message may be sent to a clinician indicating that a tumor has been identified based on a "tumor" label determined for the image data. In an illustrative embodiment, an alert message may be sent to another device using communication interface 106, printed on printer 120 or another printer, presented visually on display 116 or another display, presented audibly using speaker 118 or another speaker, etc. based on how urgent a response is needed to a certain label. For example, if a sound signal or image data indicate an intrusion into a surveilled area, a notification message may be sent to a responder.

In an operation 228, the trained labeling model is stored to predictive model description 130. The data that describes the trained labeling model may be stored in computer-readable medium 108 and/or on one or more computing devices of distributed computing system 132 in a variety of formats as understood by a person of skill in the art. For illustration, the trained labeling model may be stored using the ASTORE procedure provided by SAS® Visual Data Mining and Machine Learning software.

Referring to FIG. 2B, in operation 230, an entropy value a is computed for each observation vector in input unlabeled dataset 126 using the label distribution probabilities computed for the respective observation vector. For example, the entropy value is computed using $$\sigma = -\sum_{i=1}^{c} F_{j,i} * \log F_{j,i},$$

where j=1, ..., N is an index to a respective observation vector.

In an operation 232, an uncertainty rank value $r_u$ is determined for each observation vector in input unlabeled dataset 126 based on the computed entropy value. For example, the observation vector having a maximum entropy value is determined to have $r_u$=1, the observation vector having a second highest entropy value is determined to have $r_u$=2, the observation vector having a third highest entropy value is determined to have $r_u$=3, and so on to determine the uncertainty rank value for each observation vector in input unlabeled dataset 126.

In an operation 234, a full covariance matrix $\Sigma_{full}$ is computed using each observation vector in input unlabeled dataset 126 as a measure of a joint variability between each variable. The full covariance matrix $\Sigma_{full}$ is a sum of a computed within class covariance matrix and a computed between class covariance matrix computed, for example, using $$\sum_{full} = \sum_{i=1}^{N} (x_i - m)(x_i - m)^\top,$$

where m is a mean vector that includes a mean value computed for each variable value.

In an operation 236, the principal components function indicated by the fifth indicator is applied to the computed full covariance matrix $\Sigma_{full}$ to define principal components for input unlabeled dataset 126.

In an operation 238, each observation vector in input unlabeled dataset 126 is projected into a space defined by the principal components to define a projected observation vector $x_{p,j}$, j=1 ..., N.

In an operation 240, a mean observation vector $\mu_i$, i=1, ..., c is computed for each label of label set Q. For example, a mean value is computed for each variable of the observation vectors having the same $y_j$-variable value equal to i and defined as the mean observation vector $\mu_i$ for the respective label index i.

In an operation 242, each mean observation vector $\mu_i$, i=1, ..., c is projected into the space defined by the principal components to define a projected mean observation vector $\mu_{p,i}$ for each respective label index i.

In an operation 244, a covariance matrix $\Sigma_i$, i=1, ..., c is computed for each label of label set Q. For example, the covariance matrix is computed between each variable of the observation vectors having the same $y_j$-variable value equal to i and defined as the covariance matrix $\Sigma_i$ for the respective label index i. The computation of the covariance matrix $\Sigma_i$, i=1, ..., c includes the computed mean observation vector $\mu_i$ computed for each label of label set Q.

In an operation 246, each covariance matrix $\Sigma_i$, i=1, ..., c is projected into the space defined by the principal components to define a projected covariance matrix $\Sigma_{p,i}$ for each respective label index i.

In an operation 248, the number of eigenvalues $n_e$ indicated for each label of label set Q using the sixth indicator are selected as the $n_e$ smallest eigenvalues from each projected covariance matrix $\Sigma_{p,i}$, i=1, ..., c for the respective label index i. The number of eigenvalues $n_e$ may be the same value or may be different values for one or more of the labels of label set Q.

In an operation 250, a null space $W_i$ is defined for each label of label set Q using the selected $n_e$ smallest eigenvalues defined for the respective label i. Null space $W_i$ is an approximate null space that provides a compact representation of high dimensional data and that serves as a discriminative space to separate correlated data and provide a measure of diversity of the correlated data in the high-dimensional space.

In an operation 252, a distance vector is computed between each projected observation vector in input unlabeled dataset 126 and the projected mean observation vector $\mu_{p,i}$, i=1, ..., c having the same $y_j$-variable value equal to Q(i) assigned to the respective observation vector. For example, the distance vector can be computed using $D_j = x_{p,j} - \mu_{p,i}$, j=1, ..., N, where i is the label index selected for observation vector $x_j$ in operation 222.

In an operation 254, a distance value is computed for each observation vector in input unlabeled dataset 126 by computing a Euclidian norm of a null space projected distance vector computed for each respective observation vector. The null space projected distance vector is computed by projecting the computed distance vector into the null space $W_i$ defined for the same $y_1$-variable value equal to Q(i) assigned to the respective observation vector. For example, the distance value can be computed using $d_j = \|W_i(D_j)\|$, j=1, ..., N, where i is the label index selected for the observation vector $x_j$ in operation 222.

Figure 3:
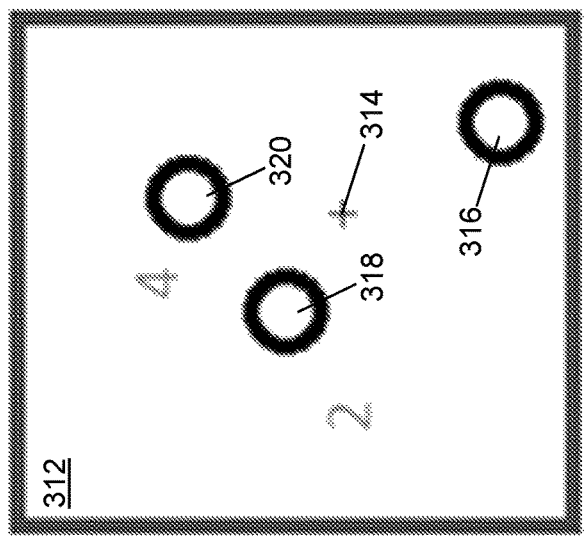
FIG. 3 graphically depicts a diversity ranking process performed by the data labeling device of FIG. 1 in accordance with an illustrative embodiment.
Figure 3:
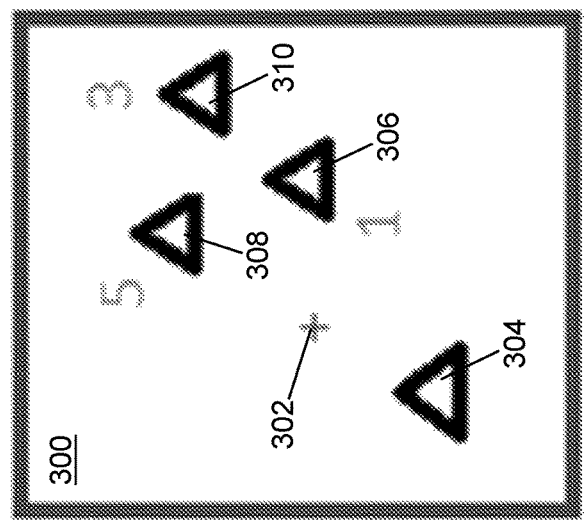

In an operation 256, a diversity rank value $r_d$ is determined for each observation vector in input unlabeled dataset 126 based on the computed distance value using an alternating label selection process. For illustration, the alternating label selection process is shown referring to FIG. 3. A first label class 300 includes a first projected mean observation vector $\mu_{p,1}$ 302, a first projected observation vector 304, a second projected observation vector 306, a third projected observation vector 308, and a fourth projected observation vector 310 each of which was selected to have the $y_1$-variable value in operation 222. A second label class 312 includes a second projected mean observation vector $\mu_{p,2}$ 314, a fifth projected observation vector 316, a sixth projected observation vector 318, and a seventh projected observation vector 320 each of which was selected to have the $y_2$-variable value in operation 222. Second projected observation vector 306 is selected to have $r_d$=1 because it is in the first label class i=1 and has a minimum distance value to first projected mean observation vector $\mu_{p,1}$ 302 relative to the other observation vectors selected to have the $y_1$-variable value in operation 222. Sixth projected observation vector 318 is selected to have $r_d=2$ because it is in the second label class i=2 and has a minimum distance value to second projected mean observation vector $\mu_{p,2}$ 314 relative to the other observation vectors selected to have the $y_2$-variable value in operation 222. Fourth projected observation vector 310 is selected to have $r_d=3$ because it is in the first label class i=1 and has a next minimum distance value to first projected mean observation vector $\mu_{p,1}$ 302 relative to the remaining observation vectors selected to have the $y_1$-variable value in operation 222. Seventh projected observation vector 320 is selected to have $r_d=4$ because it is in the second label class i=2 and has a next minimum distance value to second projected mean observation vector $\mu_{p,2}$ 314 relative to the remaining observation vectors selected to have the $y_2$-variable value in operation 222. Third projected observation vector 308 is selected to have $r_d=5$ because it is in the first label class i=1 and has a next minimum distance value to first projected mean observation vector $\mu_{p,1}$ 302 relative to the remaining observation vectors selected to have the $y_1$-variable value in operation 222. The process continues alternating in a round robin fashion from label index to label index i=1, . . . , c selecting a next minimum distance value to a respective projected mean observation vector until each observation vector in input unlabeled dataset 126 has been ranked.

Referring again to FIG. 2B, in an operation 258, a combined rank value $r_c$ is determined for each observation vector in input unlabeled dataset 126 by combining the computed diversity rank value with the computed uncertainty rank value using the uncertainty weighting value k indicated by the third indicator. For example, the combined rank value may be computed using $r_{c,j}=r_{d,j}+kr_{u,j}$, j=1, . . . , N for each observation vector $x_j$.

In an operation 260, the number of supplemental labeled points $N_{SL}$ are selected by identifying the $N_{SL}$ observation vectors in input unlabeled dataset 126 having the highest combined rank value $r_{c,j}$ so that a most diverse and uncertain set of observation vectors is selected.

In an operation 262, each observation vector selected as a supplemental labeled point and the $y_j$-variable value for each observation vector $x_j$ of the selected $N_{SL}$ data points is added to input labeled dataset 124. The $y_j$-variable value may be the label selected in operation 222 or the observation vector may be presented to a user for labeling and the $y_j$-variable value is that selected by the user.

In an operation 264, each observation vector selected as a supplemental labeled point is removed from input unlabeled dataset 126, and processing continues in operation 218 to train another labeling model with the updated input labeled dataset 124.

Data labeling application 122 optimizes the process of selecting labeled data to improve classification/prediction performance. By selecting the labeled data based on a diversity measure combined with an uncertainty measure, data labeling application 122 selects the most informative data to update the labeling model.

Figure 4:
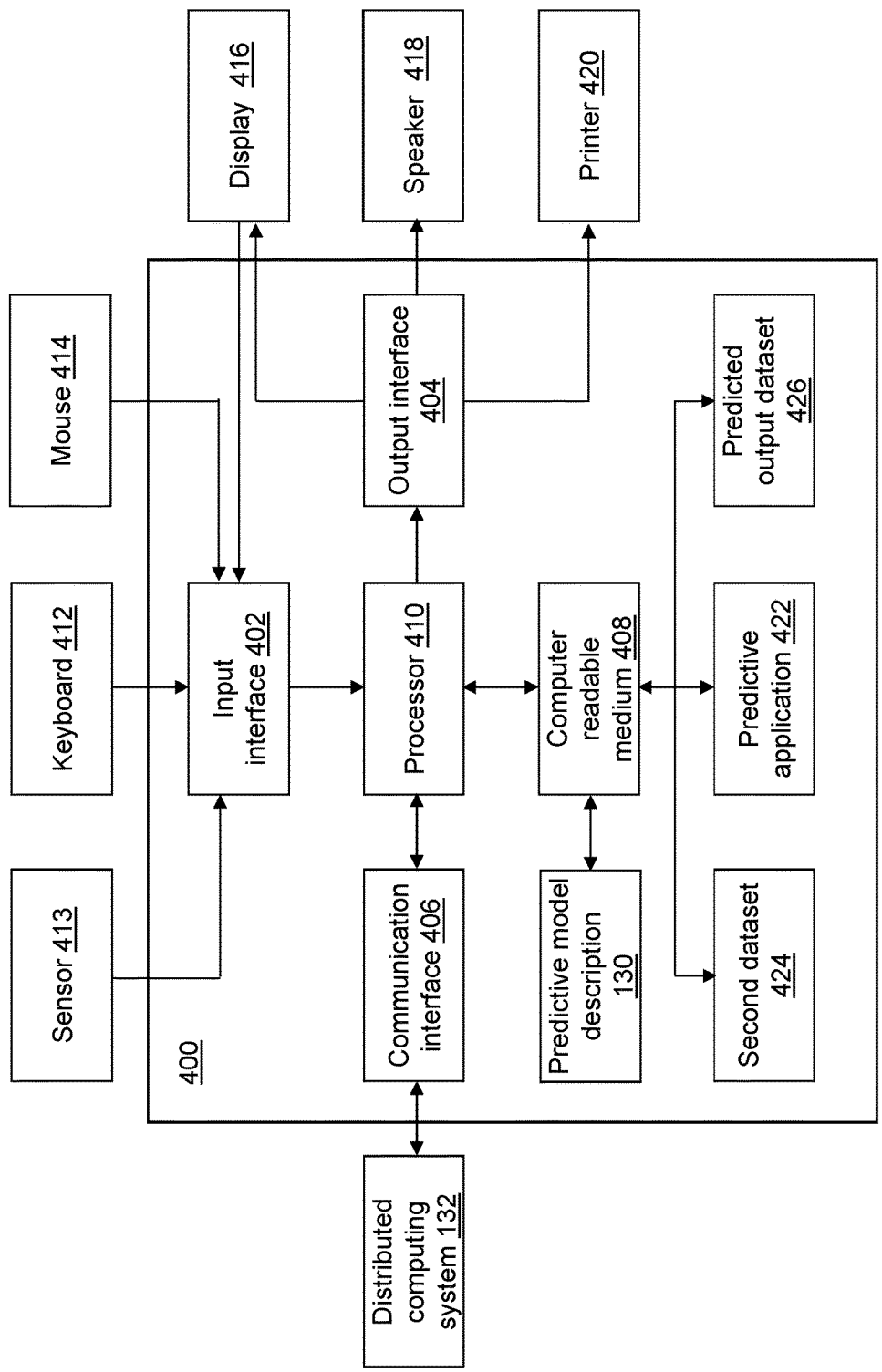
FIG. 4 depicts a block diagram of a prediction device that uses a trained labeling model to predict a result in accordance with an illustrative embodiment.

Referring to FIG. 4, a block diagram of a prediction device 400 is shown in accordance with an illustrative embodiment. Prediction device 400 may include a second input interface 402, a second output interface 404, a second communication interface 406, a second non-transitory computer-readable medium 408, a second processor 410, a predictive application 422, predictive model description 130, a second dataset 424, and predicted output dataset 426. Fewer, different, and/or additional components may be incorporated into prediction device 400. Prediction device 400 and data labeling device 100 may be the same or different devices.

Second input interface 402 provides the same or similar functionality as that described with reference to input interface 102 of data labeling device 100 though referring to prediction device 400. Second output interface 404 provides the same or similar functionality as that described with reference to output interface 104 of data labeling device 100 though referring to prediction device 400. Second communication interface 406 provides the same or similar functionality as that described with reference to communication interface 106 of data labeling device 100 though referring to prediction device 400. Data and messages may be transferred between prediction device 400 and distributed computing system 132 using second communication interface 406. Second computer-readable medium 408 provides the same or similar functionality as that described with reference to computer-readable medium 108 of data labeling device 100 though referring to prediction device 400. Second processor 410 provides the same or similar functionality as that described with reference to processor 110 of data labeling device 100 though referring to prediction device 400.

Predictive application 422 performs operations associated with predicting values for the $y_i$-variable (target) value for a new observation vector i using predictive model description 130 based on values for the variables of new observation vector i stored in second dataset 424. Dependent on the type of data stored in input unlabeled dataset 126 and second dataset 424, predictive application 422 may identify anomalies as part of process control, for example, of a manufacturing process, classify images, for example, those produced by an electro-cardiogram device, identify a fraudulent transaction, identify a health alert, for example, of a patient using health sensors, identify a cybersecurity attack using network traffic, etc. Some or all of the operations described herein may be embodied in predictive application 422. The operations may be implemented using hardware, firmware, software, or any combination of these methods.

Referring to the example embodiment of FIG. 4, predictive application 422 is implemented in software (comprised of computer-readable and/or computer-executable instructions) stored in second computer-readable medium 408 and accessible by second processor 410 for execution of the instructions that embody the operations of predictive application 422. Predictive application 422 may be written using one or more programming languages, assembly languages, scripting languages, etc. Predictive application 422 may be integrated with other analytic tools. For example, predictive application 422 may be implemented using or integrated with one or more SAS software tools such as JMP, Base SAS, SAS/STAT, of SAS Enterprise Miner SAS® High Performance Analytics Server, SAS LASR, SAS In-Database Products, SAS Scalable Performance Data Engine, SAS/OR, SAS/ETS, SAS Inventory Optimization, SAS Inventory Optimization Workbench, SAS Visual Analytics, SAS Viya, SAS In-Memory Statistics for Hadoop, SAS Forecast Server, all of which are developed and provided by SAS Institute Inc. of Cary, N.C., USA. One or more operations of predictive application 422 further may be performed by an ESPE. Predictive application 422 and data labeling application 122 further may be integrated applications.

Predictive application 422 may be implemented as a Web application. Predictive application 422 may be integrated with other system processing tools to automatically process data generated as part of operation of an enterprise using second input interface 402, second output interface 404, and/or second communication interface 406 so that appropriate action can be initiated in response. For example, a warning or an alert may be presented using a second display 416, a second speaker 418, a second printer 420, etc. or sent to one or more computer-readable media, display, speaker, printer, etc. of distributed computing system 132 based on predicted values for the response variable.

Input unlabeled dataset 126 and second dataset 424 may be generated, stored, and accessed using the same or different mechanisms. Similar to input unlabeled dataset 126, second dataset 424 may include a plurality of rows and a plurality of columns with the plurality of rows referred to as observation vectors or records, and the columns referred to as variables that are associated with an observation. Second dataset 424 may be transposed.

Similar to input unlabeled dataset 126, second dataset 424 may be stored on second computer-readable medium 408 or on one or more computer-readable media of distributed computing system 132 and accessed by prediction device 400 using second communication interface 406. Data stored in second dataset 424 may be a sensor measurement or a data communication value, for example, from a sensor 413, may be generated or captured in response to occurrence of an event or a transaction, generated by a device such as in response to an interaction by a user with the device, for example, from a second keyboard 412 or a second mouse 414, etc. The data stored in second dataset 424 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 424 may be captured at different time points periodically, intermittently, when an event occurs, etc. One or more columns may include a time value. Similar to input unlabeled dataset 126, data stored in second dataset 424 may be generated as part of the IoT, and some or all data may be pre- or post-processed by an ESPE.

Similar to input unlabeled dataset 126, second dataset 424 may be stored in various compressed formats such as a coordinate format, a compressed sparse column format, a compressed sparse row format, etc. Second dataset 424 further may be stored using various structures as known to those skilled in the art including a file system, a relational database, a system of tables, a structured query language database, etc. on data labeling device 100, on prediction device 400, and/or on distributed computing system 132. Prediction device 400 and/or distributed computing system 132 may coordinate access to second dataset 424 that is distributed across a plurality of computing devices. For example, second dataset 424 may be stored in a cube distributed across a grid of computers as understood by a person of skill in the art. As another example, second dataset 424 may be stored in a multi-node Hadoop cluster. As another example, second dataset 424 may be stored in a cloud of computers and accessed using cloud computing technologies, as understood by a person of skill in the art. The SAS LASR Analytic Server and/or SAS Viya may be used as an analytic platform to enable multiple users to concurrently access data stored in second dataset 424.

Figure 5:
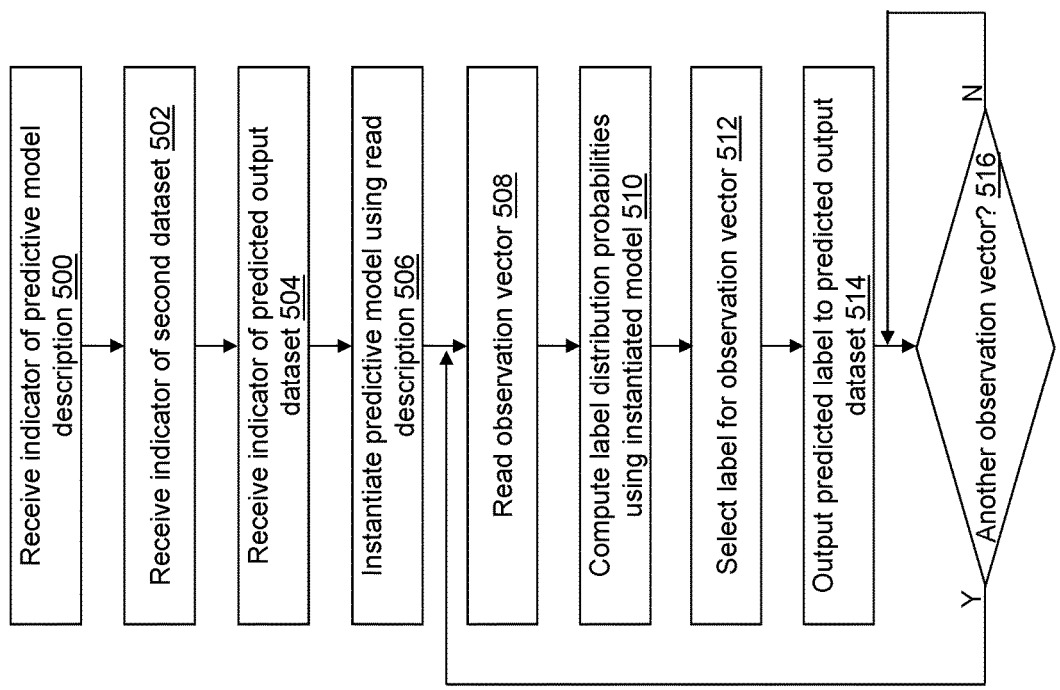
FIG. 5 depicts a flow diagram illustrating examples of operations performed by the prediction device of FIG. 4 in accordance with an illustrative embodiment.

Referring to FIG. 5, example operations of predictive application 422 are described. Additional, fewer, or different operations may be performed depending on the embodiment of predictive application 422. The order of presentation of the operations of FIG. 5 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 500, a ninth indicator may be received that indicates predictive model description 130. For example, the ninth indicator indicates a location and a name of predictive model description 130. As an example, the ninth indicator may be received by predictive application 422 after training from a user interface window or after entry by a user into a user interface window. In an alternative embodiment, predictive model description 130 may not be selectable. For example, a most recently created predictive model description may be used automatically.

In an operation 502, a tenth indicator may be received that indicates second dataset 424. For example, the tenth indicator indicates a location and a name of second dataset 424. As an example, the tenth indicator may be received by predictive application 422 after training from a user interface window or after entry by a user into a user interface window. In an alternative embodiment, second dataset 424 may not be selectable. For example, a most recently created dataset may be used automatically.

In an operation 504, an eleventh indicator may be received that indicates predicted output dataset 426. For example, the eleventh indicator indicates a location and a name of predicted output dataset 426. As an example, the eleventh indicator may be received by predictive application 422 after training from a user interface window or after entry by a user into a user interface window. In an alternative embodiment, predicted output dataset 426 may not be selectable. For example, a default name and location for predicted output dataset 426 may be used automatically.

In an operation 506, a predictive model is instantiated based on the predictive model description read from predictive model description 130. For example, the compressed gradient boosting model may be instantiated using the ASTORE procedure, for example, as described in U.S. Pat. No. 9,619,491.

In an operation 508, an observation vector is read from a next line of second dataset 424 or optionally is received from an ESPE.

In an operation 510, the read or received observation vector is input to the instantiated predictive model to compute label distribution probabilities for the observation vector.

In an operation 512, the observation vector is labeled by selecting the label from label set Q associated with the label index having the highest label distribution probability of the computed label distribution probabilities.

In an operation 514, the label for the observation vector is output to predicted output dataset 426. The read observation vector and/or other values read from second dataset 424 further may be output to predicted output dataset 426. The predicted label may be output using second display 416, second speaker 418, second printer 420, or may be output to another device using distributed computing system 132. For example, an alert message may be sent to a smart phone based on the label predicted for the observation vector.

In an operation 516, a determination is made concerning whether there is another observation vector to process. When there is another observation vector to process, processing continues in operation 508. When there is not another observation vector to process, processing continues in operation 516 to wait for receipt of another observation vector, for example, from an ESPE, or processing is done.

Experimental results were generated by applying data labeling application 122 to an image classification problem. The labeling model selected was a first neural network that used a convolutional layer followed by a maximum pooling layer and a dropout layer. The filter size was chosen to be 64 and the kernel size was chosen to be two. Subsequently, a similar architecture of a second neural network with a smaller filter size down sampled by two was applied on top of the first neural network. Finally, a flatten layer and a softmax function was applied on the output of the second neural network to define a final output of the labeling model. For illustration, the code below illustrates an implementation to define the labeling model:

```
model=tf.keras.Sequential( )
model.add(tf.keras.layers.Conv2D(filters=64, kernel_size=2, padding='same', activation='relu', input_shape=(28,28,1)))
model.add(tf.keras.layers.MaxPooling2D(pool_size=2))
model.add(tf.keras.layers.Dropout(0.3))
model.add(tf.keras.layers.Conv2D(filters=32, kernel_size=2, padding='same', activation='relu'))
model.add(tf.keras.layers.MaxPooling2D(pool_size=2))
model.add(tf.keras.layers.Dropout(0.3))
model.add(tf.keras.layers.Flatten( ))
model.add(tf.keras.layers.Dense(256, activation='relu'))
model.add(tf.keras.layers.Dropout(0.5))
model.add(tf.keras.layers.Dense(10,
    activation='softmax'))
```

Experimental results were generated using input labeled dataset 124 with 2000 observation vectors with 1000 total observation vectors added as supplemental labeled points, k=0.5, and $n_e$=20. For each iteration of operation 260, 300 observation vectors were selected randomly from the 1000 total observation vectors and added into input labeled dataset 124 from input unlabeled dataset 126 for each of 5 iterations. A validation was conducted using 10,000 observation vectors with the trained labeling model, and the input image dimension was 28 by 28 pixels. Data labeling application 122 executed with the neural network as the labeling model achieved an image classification accuracy of 0.97 using the MNIST dataset with 10 classes for handwritten digit recognition. Executing the neural network alone with 3000 labeled observation vectors achieved an image classification accuracy of 0.88 using the MNIST dataset. Executing the neural network with only the uncertainty rank used to select the supplemental labeled points (operations 234 to 256 were not performed so the diversity rank was zero and the uncertainty weighting value k was one) achieved an image classification accuracy of 0.925 using the MNIST dataset. Data labeling application 122 achieved an accuracy that was 4.5 percent better compared to executing the neural network with the uncertainty rank alone and that was ~10 percent better compared to executing the neural network alone using the MNIST dataset.

Data labeling application 122 executed with the neural network as the labeling model achieved an image classification accuracy of 0.87 using the fashion MNIST dataset with 10 classes for clothes recognition, k=0.5, and $n_e$=20. Executing the neural network alone with 3000 labeled observation vectors achieved an image classification accuracy of 0.81 using the fashion MNIST dataset. Executing the neural network with only the uncertainty rank used to select the supplemental labeled points achieved an image classification accuracy of 0.83 using the fashion MNIST dataset. Data labeling application 122 achieved an accuracy that was 4 percent better compared to executing the neural network with the uncertainty rank alone and that was ~6 percent better compared to executing the neural network alone using the fashion MNIST dataset.

Figure 6:
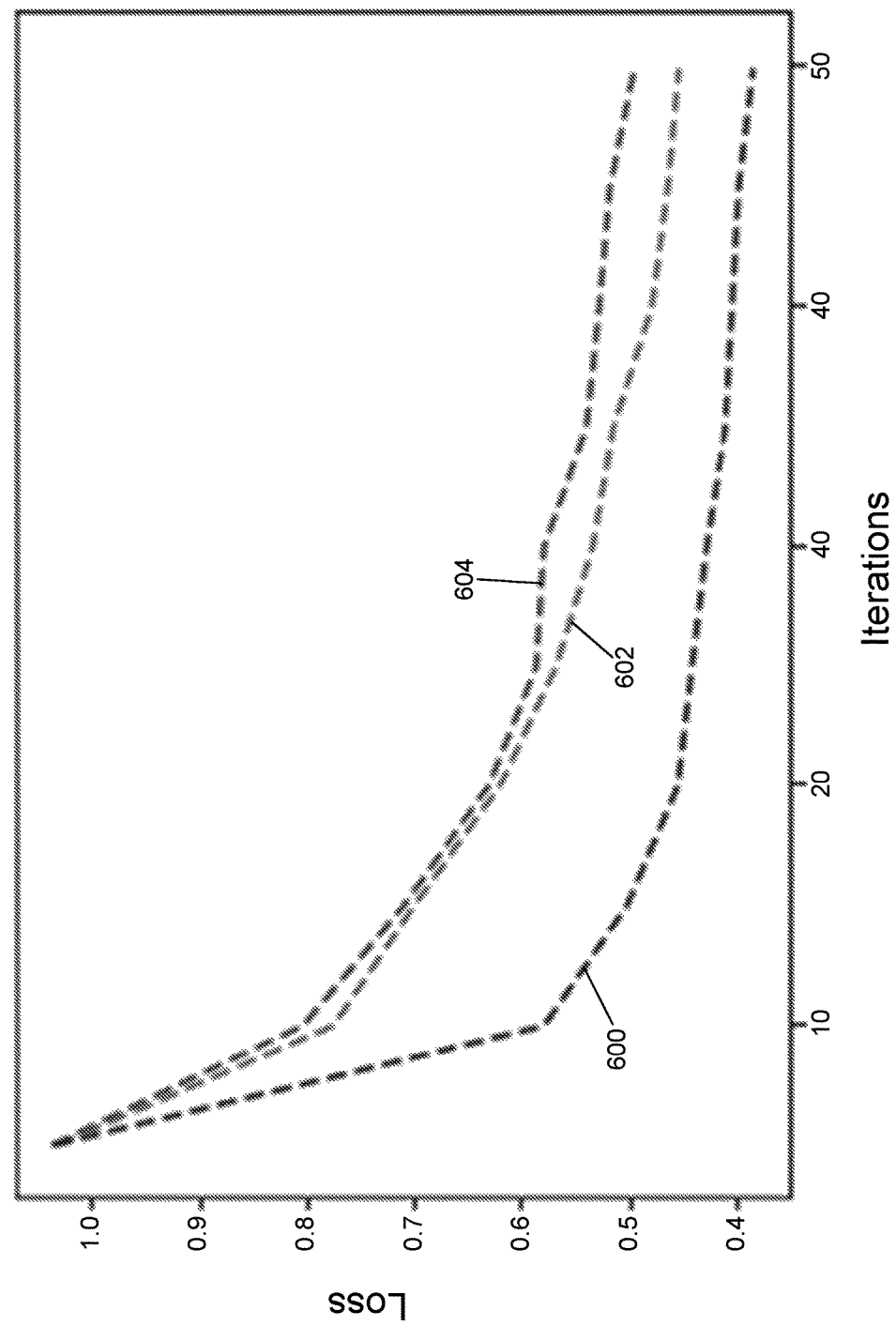
FIG. 6 depicts a loss comparison between data labeling processes.

Referring to FIG. 6, a test loss comparison is shown using the fashion MNIST dataset. The loss computation was computed as a squared difference between the label assigned to each image and a ground truth of each image for a specific class. A first loss curve 600 shows a loss as a function of a number of iterations of operation 260 of data labeling application 122. A second loss curve 602 shows a loss as a function of a number of iterations of operation 260 of executing the neural network with only the uncertainty rank used to select the supplemental labeled points. A third loss curve 604 shows a loss as a function of a number of iterations executing only the neural network. For third loss curve 604, each iteration included additional labeled points in input labeled dataset 124 instead of supplemental labeled points. The results show that data labeling application 122 significantly outperforms executing the neural network alone even with additional labeled points and executing the neural network with only the uncertainty rank. The performance gain can be primarily attributed to inclusion of the diversity rank computed in the null space representation.

Data labeling application 122 can be implemented as part of a machine learning application. Data labeling application 122 lowers the cost associated with training the object labeling process because fewer samples are needed to be labeled while achieving improved accuracy.

Data labeling application 122 can be used for image recognition on the Internet. For example, the target is to identify whether an image is or is not an image of a cat based on a limited time and resource budget. The labeling task is usually accomplished by volunteers. Using data labeling application 122, the best set for the training data (images with a cat or images with a cat) is identified.

Data labeling application 122 can be used for image recognition in sports analysis to recognize human actions such as diving, walking, running, swinging, kicking, lifting, etc. Image recognition in this area is a challenging task due to significant intra-class variations, occlusion, and background cluster for big data. Most of the existing work uses action models based on statistical learning algorithms for classification. To obtain ideal recognition results, a massive amount of the labeled samples are required to train the complicated human action models. However, collecting labeled samples is very costly. Data labeling application 122 addresses this challenging by selecting the most informative labeled human action samples using a smaller budget while providing better classification results.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
read a plurality of labeled observation vectors from a dataset;
read a plurality of unlabeled observation vectors from the dataset;
(A) train a labeling model using the read plurality of labeled observation vectors;
(B) execute the trained labeling model with each observation vector of the plurality of unlabeled observation vectors to define a label distribution probability matrix, wherein the label distribution probability matrix defines a label probability for each label of a label set for each observation vector of the plurality of unlabeled observation vectors;
(C) select a label for each observation vector of the plurality of unlabeled observation vectors as the label associated with a maximum label probability value in the label distribution probability matrix for a respective observation vector of the plurality of unlabeled observation vectors;
(D) for each label of the label set, compute a mean observation vector from the observation vectors of the plurality of unlabeled observation vectors selected to have each respective label;
(E) for each label of the label set, compute a covariance matrix from the observation vectors of the plurality of unlabeled observation vectors selected to have each respective label;
(F) for each label of the label set, select a number of eigenvalues from the covariance matrix computed for each respective label, wherein the selected eigenvalues have a smallest value of the eigenvalues for each respective label;
(G) for each label of the label set, define a null space using the selected eigenvalues for each respective label;
(H) for each observation vector of the plurality of unlabeled observation vectors, compute a distance vector from each respective observation vector to the computed mean observation vector associated with the label selected for each respective observation vector;
(I) for each observation vector of the plurality of unlabeled observation vectors, compute a distance value from each respective computed distance vector projected into the defined null space associated with the label selected for each respective observation vector;
(J) for each observation vector of the plurality of unlabeled observation vectors, determine a diversity rank based on a minimum computed distance value for the computed distance value for each respective observation vector;
(K) select a predefined number of observation vectors from the plurality of unlabeled observation vectors, wherein the predefined number of observation vectors have the predefined number of observation vectors number of highest values for the diversity rank;
(L) update the plurality of labeled observation vectors to include the selected observation vectors with the label selected for each respective observation vector;
(M) remove the selected observation vectors from the plurality of unlabeled observation vectors;
(N) repeat operations (A) to (M) a predefined number of times; and
after the predefined number of times, output the label selected for each observation vector of the plurality of unlabeled observation vectors to a second dataset.

2. The non-transitory computer-readable medium of claim 1, wherein the computer-readable instructions further cause the computing device to read the label set, wherein the label set defines permissible values for a target variable.

3. The non-transitory computer-readable medium of claim 2, wherein each observation vector defines an image, and the value of the target variable defines an image label.

4. The non-transitory computer-readable medium of claim 2, wherein each observation vector defines an image of a video file, and the value of the target variable defines a change in the image relative to previous images of the video file.

5. The non-transitory computer-readable medium of claim 2, wherein each observation vector includes a plurality of sensor measurement, and the value of the target variable defines a state of a device from which the plurality of sensor measurement are sensed.

6. The non-transitory computer-readable medium of claim 1, wherein after (B) and before (K), the computer-readable instructions further cause the computing device to:
for each observation vector of the plurality of unlabeled observation vectors, compute an entropy value from the label distribution probability matrix for each respective observation vector of the plurality of unlabeled observation vectors;
for each observation vector of the plurality of unlabeled observation vectors, determine an uncertainty rank based on the computed entropy value for each respective observation vector; and
after (J), determine a combined rank as a combination of the determined diversity rank and the determined uncertainty rank, wherein selecting the predefined number of observation vectors from the plurality of unlabeled observation vectors is based on the combined rank.

7. The non-transitory computer-readable medium of claim 6, wherein the uncertainty rank is based on an order of the plurality of unlabeled observation vectors from a maximum entropy value to a minimum entropy value.

8. The non-transitory computer-readable medium of claim 6, wherein the combined rank is computed using $r_{c,j}=r_{d,j}+kr_{u,j}$, $j=1, \ldots, N$ for each respective observation vector $x_j$ of the plurality of unlabeled observation vectors, where $r_{c,j}$ is the combined rank for observation vector $x_j$, $r_{d,j}$ is the diversity rank for observation vector $x_j$, $r_{u,j}$ is the uncertainty rank for observation vector $x_j$, N is a number of the plurality of unlabeled observation vectors, and k is a predefined uncertainty weighting value.

9. The non-transitory computer-readable medium of claim 1, wherein the entropy value is computed using $$\sigma = -\sum_{i=1}^{c} F_{j,i} * \log F_{j,i},$$

where $F_{j,i}$ is the label distribution probability matrix for each respective observation vector $x_j$ $j=1, \ldots, N$ of the plurality of unlabeled observation vectors and for each respective label of the label set $i=1, \ldots, c$, N is a number of the plurality of unlabeled observation vectors, and c is a number of labels included in the label set.

10. The non-transitory computer-readable medium of claim 1, wherein determining the diversity rank uses an alternating label selection process.

11. The non-transitory computer-readable medium of claim 10, wherein the alternating label selection process comprises assigning successive rank values to observation vectors by successively selecting each label and selecting the observation vector of remaining observation vectors associated with the respective label having a minimum distance value to the mean observation vector of the respective label until a diversity rank is determined for each of the plurality of unlabeled observation vectors.

12. The non-transitory computer-readable medium of claim 1, wherein the plurality of labeled observation vectors and the plurality of unlabeled observation vectors are stored in two different datasets.

13. The non-transitory computer-readable medium of claim 1, wherein after the predefined number of times, the computer-readable instructions further cause the computing device to output the trained labeling model.

14. The non-transitory computer-readable medium of claim 1, wherein after the predefined number of times, the computer-readable instructions further cause the computing device to:
read an observation vector from a second dataset;
compute a label probability for each label of the label set for the read observation vector using the trained labeling model and the read observation vector;
select the label for the read observation vector as the label associated with the maximum label probability value of the label probability computed for each label; and
output the selected label to a third dataset.

15. The non-transitory computer-readable medium of claim 1, wherein after the predefined number of times, the computer-readable instructions further cause the computing device to:
receive an observation vector from a second computing device in an event stream;
compute a label probability for each label of the label set for the read observation vector using the trained labeling model and the received observation vector;
select the label for the observation vector as the label associated with the maximum label probability value of the label probability computed for each label; and
output the selected label to a third computing device in a second event stream.

16. The non-transitory computer-readable medium of claim 1, wherein the labeling model is one or more of a support vector machine model, a k-means clustering model, a neural network model, a logistic regression model, a random forest model, a gradient boosting tree model, and a decision tree model.

17. The non-transitory computer-readable medium of claim 1, wherein the distance vector is computed using $D_j = x_j - \mu_i$, $j=1, \ldots, N$, where $D_j$ is the distance vector for the $j^{th}$ observation vector of the plurality of unlabeled observation vectors, $x_j$ is the $j^{th}$ observation vector of the plurality of unlabeled observation vectors, i is a label index selected for the $j^{th}$ observation vector $x_j$, $\mu_i$ is the computed mean observation vector associated with the label selected for the $j^{th}$ observation vector $x_j$, and N is a number of the plurality of unlabeled observation vectors.

18. The non-transitory computer-readable medium of claim 17, wherein the distance value is computed using $d_j = \|W_i(D_j)\|$, $j=1, \ldots, N$, where $d_j$ is the distance value for the $j^{th}$ observation vector of the plurality of unlabeled observation vectors, and $W_i$ is the defined null space associated with the label selected for the $j^{th}$ observation vector $x_j$.

19. The non-transitory computer-readable medium of claim 1, wherein before (F), the computer-readable instructions further cause the computing device to:
compute a full covariance matrix using each observation vector of the plurality of unlabeled observation vectors;
apply a principal components function to the computed full covariance matrix to define principal components;
project each observation vector of the plurality of unlabeled observation vectors into a principal component space using the defined principal components;
after (D), project each computed mean observation vector into the principal component space using the defined principal components;
after (E), project each computed covariance matrix into the principal component space using the defined principal components,
wherein in (F), the number of eigenvalues are selected from a respective projected covariance matrix computed for each respective label,
wherein in (H), the distance vector is computed using each respective projected observation vector and each respective projected mean observation vector.

20. The non-transitory computer-readable medium of claim 19, wherein the principal components function is one of a robust principal components function, a Laplacian eigenmap function, an isomap function, a linear discriminant analysis function, and a principal components analysis function.

21. A computing device comprising:
a processor; and
a non-transitory computer-readable medium operably coupled to the processor, the computer-readable medium having computer-readable instructions stored thereon that, when executed by the processor, cause the computing device to
read a plurality of labeled observation vectors from a dataset;
read a plurality of unlabeled observation vectors from the dataset;
(A) train a labeling model using the read plurality of labeled observation vectors;
(B) execute the trained labeling model with each observation vector of the plurality of unlabeled observation vectors to define a label distribution probability matrix, wherein the label distribution probability matrix defines a label probability for each label of a label set for each observation vector of the plurality of unlabeled observation vectors;
(C) select a label for each observation vector of the plurality of unlabeled observation vectors as the label associated with a maximum label probability value in the label distribution probability matrix for a respective observation vector of the plurality of unlabeled observation vectors;
(D) for each label of the label set, compute a mean observation vector from the observation vectors of the plurality of unlabeled observation vectors selected to have each respective label;

(E) for each label of the label set, compute a covariance matrix from the observation vectors of the plurality of unlabeled observation vectors selected to have each respective label;

(F) for each label of the label set, select a number of eigenvalues from the covariance matrix computed for each respective label, wherein the selected eigenvalues have a smallest value of the eigenvalues for each respective label;

(G) for each label of the label set, define a null space using the selected eigenvalues for each respective label;

(H) for each observation vector of the plurality of unlabeled observation vectors, compute a distance vector from each respective observation vector to the computed mean observation vector associated with the label selected for each respective observation vector;

(I) for each observation vector of the plurality of unlabeled observation vectors, compute a distance value from each respective computed distance vector projected into the defined null space associated with the label selected for each respective observation vector;

(J) for each observation vector of the plurality of unlabeled observation vectors, determine a diversity rank based on a minimum computed distance value for the computed distance value for each respective observation vector;

(K) select a predefined number of observation vectors from the plurality of unlabeled observation vectors, wherein the predefined number of observation vectors have the predefined number of observation vectors number of highest values for the diversity rank;

(L) update the plurality of labeled observation vectors to include the selected observation vectors with the label selected for each respective observation vector;

(M) remove the selected observation vectors from the plurality of unlabeled observation vectors;

(N) repeat operations (A) to (M) a predefined number of times; and after the predefined number of times, output the label selected for each observation vector of the plurality of unlabeled observation vectors to a second dataset.

22. The computing device of claim 21, wherein after (B) and before (K), the computer-readable instructions further cause the computing device to:

for each observation vector of the plurality of unlabeled observation vectors, compute an entropy value from the label distribution probability matrix for each respective observation vector of the plurality of unlabeled observation vectors;

for each observation vector of the plurality of unlabeled observation vectors, determine an uncertainty rank based on the computed entropy value for each respective observation vector; and after (J), determine a combined rank as a combination of the determined diversity rank and the determined uncertainty rank, wherein selecting the predefined number of observation vectors from the plurality of unlabeled observation vectors is based on the combined rank.

23. The computing device of claim 22, wherein the combined rank is computed using $r_{c,j} = r_{d,j} + k r_{u,j}$, $j=1, \ldots, N$ for each respective observation vector $x_j$ of the plurality of unlabeled observation vectors, where $r_{c,j}$ is the combined rank for observation vector $x_j$, $r_{d,j}$ is the diversity rank for observation vector $x_j$, $r_{u,j}$ is the uncertainty rank for observation vector $x_j$, N is a number of the plurality of unlabeled observation vectors, and k is a predefined uncertainty weighting value.

24. The computing device of claim 21, wherein determining the diversity rank uses an alternating label selection process, wherein the alternating label selection process comprises assigning successive rank values to observation vectors by successively selecting each label and selecting the observation vector of remaining observation vectors associated with the respective label having a minimum distance value to the mean observation vector of the respective label until a diversity rank is determined for each of the plurality of unlabeled observation vectors.

25. A method of predicting occurrence of an event or classifying an object using semi-supervised data to label unlabeled data in a dataset, the method comprising:

reading, by a computing device, a plurality of labeled observation vectors from a dataset;

reading, by the computing device, a plurality of unlabeled observation vectors from the dataset;

(A) training, by the computing device, a labeling model using the read plurality of labeled observation vectors;

(B) executing, by the computing device, the trained labeling model with each observation vector of the plurality of unlabeled observation vectors to define a label distribution probability matrix, wherein the label distribution probability matrix defines a label probability for each label of a label set for each observation vector of the plurality of unlabeled observation vectors;

(C) selecting, by the computing device, a label for each observation vector of the plurality of unlabeled observation vectors as the label associated with a maximum label probability value in the label distribution probability matrix for a respective observation vector of the plurality of unlabeled observation vectors;

(D) for each label of the label set, computing, by the computing device, a mean observation vector from the observation vectors of the plurality of unlabeled observation vectors selected to have each respective label;

(E) for each label of the label set, computing, by the computing device, a covariance matrix from the observation vectors of the plurality of unlabeled observation vectors selected to have each respective label;

(F) for each label of the label set, selecting, by the computing device, a number of eigenvalues from the covariance matrix computed for each respective label, wherein the selected eigenvalues have a smallest value of the eigenvalues for each respective label;

(G) for each label of the label set, defining, by the computing device, a null space using the selected eigenvalues for each respective label;

(H) for each observation vector of the plurality of unlabeled observation vectors, computing, by the computing device, a distance vector from each respective observation vector to the computed mean observation vector associated with the label selected for each respective observation vector;

(I) for each observation vector of the plurality of unlabeled observation vectors, computing, by the computing device, a distance value from each respective computed distance vector projected into the defined null space associated with the label selected for each respective observation vector;

(J) for each observation vector of the plurality of unlabeled observation vectors, determining, by the computing device, a diversity rank based on a minimum computed distance value for the computed distance value for each respective observation vector;

(K) selecting, by the computing device, a predefined number of observation vectors from the plurality of unlabeled observation vectors, wherein the predefined number of observation vectors have the predefined number of observation vectors number of highest values for the diversity rank;

(L) updating, by the computing device, the plurality of labeled observation vectors to include the selected observation vectors with the label selected for each respective observation vector;

(M) removing, by the computing device, the selected observation vectors from the plurality of unlabeled observation vectors;

(N) repeating, by the computing device, operations (A) to (M) a predefined number of times; and after the predefined number of times, outputting, by the computing device, the label selected for each observation vector of the plurality of unlabeled observation vectors to a second dataset.

26. The method of claim 25, further comprising, after (B) and before (K):

for each observation vector of the plurality of unlabeled observation vectors, computing, by the computing device, an entropy value from the label distribution probability matrix for each respective observation vector of the plurality of unlabeled observation vectors;

for each observation vector of the plurality of unlabeled observation vectors, determining, by the computing device, an uncertainty rank based on the computed entropy value for each respective observation vector; and after (J), determining, by the computing device, a combined rank as a combination of the determined diversity rank and the determined uncertainty rank, wherein selecting the predefined number of observation vectors from the plurality of unlabeled observation vectors is based on the combined rank.

27. The method of claim 26, wherein the uncertainty rank is based on an order of the plurality of unlabeled observation vectors from a maximum entropy value to a minimum entropy value.

28. The method of claim 26, wherein the combined rank is computed using $r_{c,j} = r_{d,j} + k r_{u,j}$, $j=1, \ldots, N$ for each respective observation vector $x_j$ of the plurality of unlabeled observation vectors, where $r_{c,j}$ is the combined rank for observation vector $x_j$, $r_{d,j}$ is the diversity rank for observation vector $x_j$, $r_{u,j}$ is the uncertainty rank for observation vector $x_j$, $N$ is a number of the plurality of unlabeled observation vectors, and $k$ is a predefined uncertainty weighting value.

29. The method of claim 25, wherein determining the diversity rank uses an alternating label selection process.

30. The method of claim 29, wherein the alternating label selection process comprises assigning successive rank values to observation vectors by successively selecting each label and selecting the observation vector of remaining observation vectors associated with the respective label having a minimum distance value to the mean observation vector of the respective label until a diversity rank is determined for each of the plurality of unlabeled observation vectors.

* * * * *

UNITED STATES PATENT AND TRADEMARK OFFICE
CERTIFICATE OF CORRECTION

PATENT NO. : 10,430,690 B1  
APPLICATION NO. : 16/400157  
DATED : October 1, 2019  
INVENTOR(S) : Xu Chen Page 1 of 1

It is certified that error appears in the above-identified patent and that said Letters Patent is hereby corrected as shown below:

In the Specification

<u>Column 13, Lines 16-17</u>:  
Delete the phrase:  
"an entropy value a is computed"  
And replace with:  
--an entropy value $\sigma$ is computed--.

In the Claims

<u>Claim 15, Column 23, Lines 46-49</u>:  
Delete the phrase:  
"compute a label probability for each label of the label set for the read observation vector using the trained labeling model and the received observation vector; select the label for the observation vector"  
And replace with:  
--compute a label probability for each label of the label set for the received observation vector using the trained labeling model and the received observation vector; select the label for the received observation vector--.

Signed and Sealed this  
Twenty-fourth Day of December, 2019

Andrei Iancu  
*Director of the United States Patent and Trademark Office*